May 14, 1957 — D. B. ELMORE — 2,792,232
LAUNCHING AND TRAILER ATTACHMENTS
Filed Aug. 25, 1954
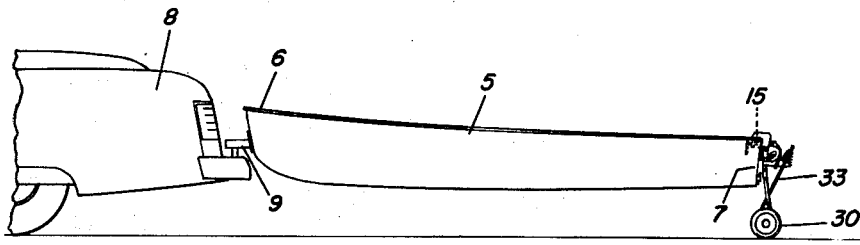
Fig. 1
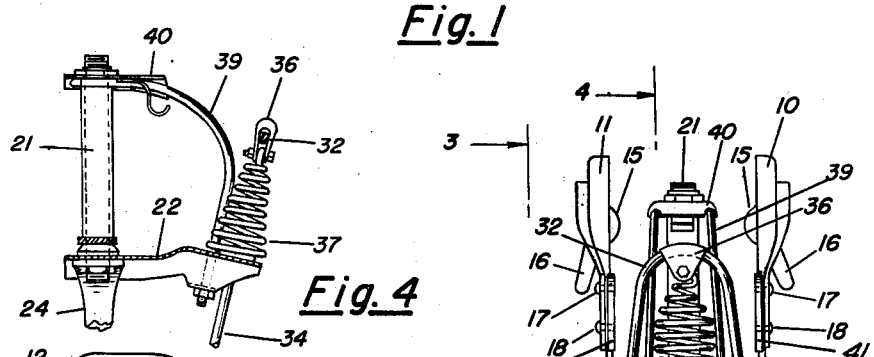
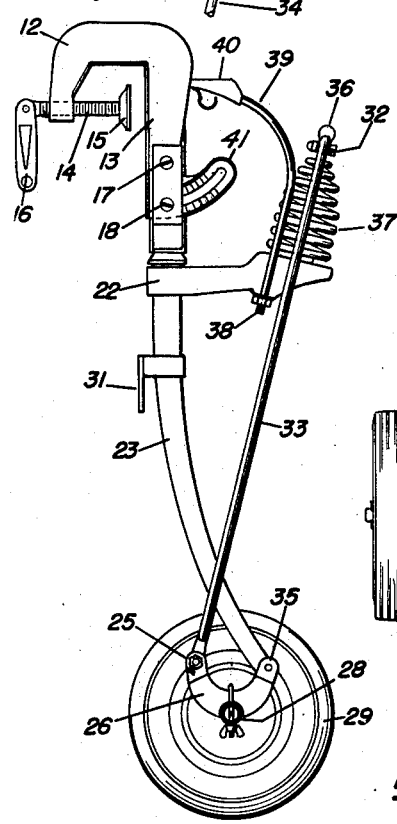
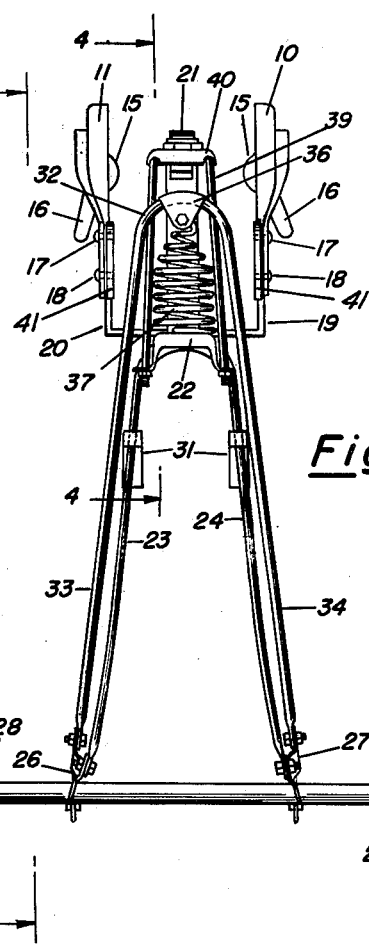
INVENTOR.
DANIEL B. ELMORE
BY
ATTORNEY

2,792,232

LAUNCHING AND TRAILER ATTACHMENTS

Daniel B. Elmore, San Diego, Calif.

Application August 25, 1954, Serial No. 452,113

3 Claims. (Cl. 280—47.13)

My invention relates to a novel attachment capable not only for the launching of a boat, but also usable as a trailer for the transportation of the same; and its objects are to provide a wheel attachment capable of being detachably secured to the stern of a boat, through the efforts of one man, and allowing the boat, when on land, readily to be launched into the water from the shore of a lake, river or the ocean and, when in the water, readily to be pulled therefrom upon the shore, said attachment as a whole being capable of being installed and removed by the occupant while the boat is still in the water without requiring the occupant to get wet; to allow said attachment, without change or adjustment, to serve as a trailer for the transportation of the boat when the bow thereof is connected with, and towed by, an automobile, motor truck or other vehicle; to provide a portable attachment which is of simple construction and sufficiently light as to be capable of being easily handled alone by the average boatman; to provide a carrier attachment supplied with knee action springs to cushion shock as the boat is towed along the highway; to render the parts accessible for inspection, adjustment, replacement, renovation and repair; and in general to provide a boat handling attachment of this character which is simple, compact and economical of construction, saving of labor, readily adjustable to different sizes of boats, and of long life and durability. My invention further consists of other novel features of construction, and combinations and arrangements of elements and parts illustrated in the drawing and as hereinafter more specifically pointed out and claimed.

Attention is hereby directed to the accompanying drawing illustrating an attachment embodying a preferred form of my invention in which similar numerals of designation refer to similar parts throughout the several views, and in which Figure 1 is a side elevation of a boat showing the said attachment applied to the stern of a boat, the bow of which is secured to a motor vehicle;

Fig. 2 is an enlarged end elevation of said attachment showing the same removed from said boat;

Fig. 3 is a side elevation of the attachment shown in Fig. 2, and

Fig. 4 is a detail sectional view on line 4—4 of Fig. 2, looking in the direction indicated by the arrows.

Referring to the drawing, the boat 5 is a small aquatic craft of conventional construction having the usual bow 6 and flat stern-board 7. For making fast said boat to an automobile or other vehicle 8, which is to be used for towing the boat, the bow of the boat is supplied with the usual type of detachable coupling 9; and for securing my improved attachment to the stern-board of the boat I employ the pair of widely separated conjoint clamps 10 and 11 and connections shortly to be described.

Each of the conjoint clamps 10 and 11, is constructed with a jaw having members 12 and 13, and through the member 12 of which extends inwardly a screw 14, in threaded engagement with an opening therethrough provided therefor; the inner end of said screw being provided with the swiveling contact head 15, and the outer end of said screw having mounted thereon and pivotally connected therewith the handle 16.

Adjustably secured by bolts 17 and 18 to the grooved segmental or arcuate extension 41 of the member 13 of each of said jaws, is the upright portion of one of the pair of elbows 19 and 20, the horizontal portions of said elbows being welded to the upright post or standard 21. Welded to the bottom of said post 21 is one end portion of the plate 22, and depending from said portion underneath said plate and welded thereto are the upper ends of the legs 23 and 24, widely spread apart, and the lower ends of which are pivotally connected with lobes 35 of the inverted U-shaped plates 26 and 27, firmly mounted upon the axle 28. Upon the ends of the axle 28 are mounted the rubber tired wheels 29 and 30; the said axle and wheels constituting a truck or carrier for the boat 5. To each of the arms 23 and 24 is preferably secured a sliphook 31, positioned and shaped to engage with a loop or catch upon the stern-board of the boat above the water line thereof; the purpose of said hook and loop being to provide an additional means insuring the attachment from possible dislodgment.

To provide spring-knee action upon the carrier, I preferably supply the yoke 32, having the depending downwardly spreadings arms 33 and 34, the lower ends of which are pivotally secured to lobes 25 of the plates 26 and 27, and the bow of which yoke is firmly bolted to the clip 36. Closely embraced by and between the said clip and the outer end portion of the plate 22, and firmly secured to both said clip and plate, is the expansion spring 37. To afford further support to the said outer portion of the plate 22, I preferably bolt to the same by bolts 38, the lower ends of the yoke 39, the bow of which curves inwardly, engages with and is held by the capplate 40, welded to the upper portion of the shaft 21.

When ready for use, the attachment is first hung upon and secured to the stern-board 7, by contacting the clamps 10 and 11 therewith, and by screwing down the screws 14 to press the swivelling heads 15 tightly against and inside the said stern-board. At the same time the slip-hooks 31 are engaged with the loops provided therefor on the outside of said stern-board. This may be done whether the boat is in or out of the water.

Used as a launching device or for pulling the boat out of water, my improved attachment will be found efficient and expeditious in handling the boat. For launching, only one man is necessary for the operation, who, upon lifting the bow portion of the boat to clear the shore, may readily push the boat upon its two wheeled truck into the water, without dragging, scraping or scratching the bottom of the boat upon the beach as is customarily the case in usual attempts at launching. Also, when the boat is in the water and close to shore, the boat readily may be pulled out of the water upon its truck by a single boatman, reversing this procedure.

Employed as a carrier, the attachment readily may be used without change for towing the boat to the place desired upon being hitched to a powered or animal-drawn vehicle; thereby dispensing with the boat cradle carrier means commonly used for the purpose and avoiding the chafing and abrading of the hull of the boat commonly occurring through such use. Also by the use of my improved knee-spring suspension means, road shock to the boat is reduced to a minimum if not practically avoided.

My invention may be embodied in other specific forms without departing from the spirit or essential characteristics thereof. The present embodiment as above set forth is therefore to be considered in all respects as illustrative and not restrictive, the scope of my invention being indicated by the appended claims rather than by the foregoing description, and all changes which may come within the meaning and range of equivalency of the claims are therefore intended to be embraced therein.

What I claim and desire to cover by Letters Patent is:

1. A removable wheeled attachment for the launching and carriage of a boat, comprising a pair of widely spaced conjoint clamping jaws adapted to be detachably secured to the stern-board of a boat; a carrier and a pair of rocking arcuate plates longitudinaly mounted thereon; a pair of legs connected with said jaws and pivotally secured to said plates; a yoke having its ends pivotally connected with said arcuate plates; and spring knee actuated means operatively connected with said yoke and legs and adapted to reduce jar and shock to the boat during the transportation thereof.

2. A removable wheeled attachment for the launching and carriage of a boat, comprising a pair of widely spaced conjoint clamping jaws adapted to be detachably secured to the stern-board of a boat; an axle; a pair of rocking arcuate plates and a pair of wheels mounted upon said axle; a pair of legs connected with said jaws and pivotally secured to said plates; a yoke having its ends pivotally connected with said plates; and spring knee actuated means operatively connected with said legs and yoke and adapted to reduce jar and shock to the boat during the transportation thereof.

3. A removable wheeled attachment for the launching and carriage of a boat, comprising a pair of widely spaced conjoint clamping jaws adapted to be detachably secured to the stern-board of a boat; an upright post pivotally and adjustably connected by brackets to said jaws; a pair of legs secured to the bottom of said post; an axle pivotally secured to the ends of said legs; a pair of wheels mounted upon said axle; a yoke having its ends pivotally connected with said axle; and spring knee actuated means operatively connected with said legs and yoke and adapted to reduce jar and shock to the boat during the transportation thereof.

References Cited in the file of this patent
UNITED STATES PATENTS

| | | |
|---|---|---|
| 2,485,484 | Dean | Oct. 18, 1949 |
| 2,500,602 | Christensen | Mar. 14, 1950 |
| 2,533,895 | Raveau | Dec. 12, 1950 |
| 2,624,591 | Choplin | Jan. 6, 1953 |
| 2,637,050 | Oliver | May 5, 1953 |